US007184432B2

(12) United States Patent
Adam et al.

(10) Patent No.: US 7,184,432 B2
(45) Date of Patent: *Feb. 27, 2007

(54) SWITCH FABRIC ARCHITECTURE AND TECHNIQUES FOR IMPLEMENTING RAPID HITLESS SWITCHOVER

(75) Inventors: Joel F. Adam, Cupertino, CA (US); Darren Engelkemier, Mountain View, CA (US); Daniel E. Klausmeier, Menlo Park, CA (US)

(73) Assignee: CIENA Corporation, Linthicum, MD (US)

( * ) Notice: Subject to any disclaimer, the term of this patent is extended or adjusted under 35 U.S.C. 154(b) by 560 days.

This patent is subject to a terminal disclaimer.

(21) Appl. No.: 10/704,976

(22) Filed: Nov. 12, 2003

(65) Prior Publication Data

US 2004/0095025 A1 May 20, 2004

Related U.S. Application Data

(62) Division of application No. 09/421,059, filed on Oct. 19, 1999, now Pat. No. 6,714,537.

(51) Int. Cl.
*H04J 3/24* (2006.01)
*H04L 12/50* (2006.01)

(52) U.S. Cl. ............... 370/360; 370/388; 340/2.21; 340/2.26; 340/2.6

(58) Field of Classification Search ............... 370/360, 370/388; 340/2.21, 2.26, 2.6
See application file for complete search history.

(56) References Cited

U.S. PATENT DOCUMENTS 5,093,824 A 3/1992 Coan et al.

(Continued)

FOREIGN PATENT DOCUMENTS

EP 0844755 8/1997

(Continued)

OTHER PUBLICATIONS

Steinar Andresen, "The Looping Algorithm Extended to Base 2 Rearrangeable Switching Networks", IEEE Transactions on Communications, vol. Com-26, No. 10, Oct. 1977.

*Primary Examiner*—Alpus H. Hsu
(74) *Attorney, Agent, or Firm*—Clements Walker; Christopher L. Bernard; Tyler S. Brown

(57) ABSTRACT

A switch is provided that receives user information through a plurality of framer circuits, which group the user information into frames. The frames are fed to a switch fabric including an array of switch elements, each having a switch matrix for routing each frame to a desired output in accordance with configuration data stored in a first table coupled to the switch matrix. If different outputs are desired, i.e., the switch matrix is to be reconfigured, a switch control circuit supplies additional switch configuration data to the frames through the inputs along with additional user information to be routed through the switch. While the additional switch configuration data is stored in a second table, data flow remains uninterrupted through the switch matrix. Once storage of the additional configuration data into the second table is complete, however, the switch control circuit inserts a table select signal into the frames, to thereby couple the second table to the switch so that the switch matrix is configured in accordance with the additional switch configuration data. Subsequent frames are then routed through the reconfigured switch matrix. The first and second tables can thus be alternately updated and coupled to the switch matrix to appropriately reconfigure the switch without affecting existing connections established through the switch. "Hitless switchover" is therefore achieved.

5 Claims, 6 Drawing Sheets

U.S. PATENT DOCUMENTS

| | | | |
|---|---|---|---|
| 5,307,465 A * | 4/1994 | Iki | 709/221 |
| 5,390,303 A * | 2/1995 | Iki | 709/221 |
| 5,426,378 A * | 6/1995 | Ong | 326/39 |
| 5,437,015 A * | 7/1995 | Iki | 709/221 |
| 5,463,486 A | 10/1995 | Stevens | |
| 5,471,332 A | 11/1995 | Shiragaki et al. | |
| 5,521,972 A * | 5/1996 | Iki | 379/230 |
| 5,566,171 A * | 10/1996 | Levinson | 370/352 |
| 5,740,211 A | 4/1998 | Bedrosian | |
| 5,751,764 A * | 5/1998 | Meyer et al. | 375/219 |
| 5,815,490 A | 9/1998 | Lu | |
| 5,872,783 A * | 2/1999 | Chin | 370/395.32 |
| 5,875,314 A * | 2/1999 | Edholm | 710/317 |
| 6,064,647 A | 5/2000 | Van Krevelen | |
| 6,208,667 B1 | 3/2001 | Caldara et al. | |
| 6,230,229 B1 | 5/2001 | Van Krevelen et al. | |
| 6,678,268 B1 * | 1/2004 | Francis et al. | 370/380 |

FOREIGN PATENT DOCUMENTS

| | | |
|---|---|---|
| WO | 9933320 | 12/1998 |

* cited by examiner

SWITCH FABRIC ARCHITECTURE AND TECHNIQUES FOR IMPLEMENTING RAPID HITLESS SWITCHOVER

This application is a Divisional of application Ser. No. 09/421,059, filed on Oct. 19, 1999 now U.S. Pat. No. 6,714,537, the entire contents of which are hereby incorporated by reference and for which priority is claimed under 35 U.S.C. § 120.

BACKGROUND OF THE INVENTION

The present invention relates to a switch fabric architecture and related techniques for implementing rapid hitless switchover.

As the use of computer and telephone networks increases, so does the need for greater bandwidth. This need spurred the growth of fiber optic networks, and a protocol for transmitting data over such networks. As a result, the synchronous optical network or "SONET" fiber optic transmission protocol was developed.

FIG. 1 illustrates a functional block diagram of a conventional SONET network with add/drop multiplexors (ADMs) as nodes. A system administrator sets up connection routes through ADMs 110–140 to transfer data between endpoints, such as port A 100 and port B 150. For example, the system administrator may program a route from origination ADM 110 through intermediate ADM 120 to the destination ADM 130, and to do so, the system administrator must program necessary route information at each ADM.

Networks, however, do not remain static, and often must be altered to accommodate varying traffic flow. In which case, ADMs are typically reconfigured through a process known as "provisioning", whereby existing connections are dropped while new ones are added. In relatively large networks in particular, provisioning can require an excessive amount of time because provisioning cannot be done automatically. Moreover, ADMs are typically rendered inoperable during provisioning, thereby increasing down-time for the network.

SUMMARY OF THE INVENTION

Systems and methods consistent with the principles of the present invention provide reconfiguration of a switch without taking the switch down or losing data.

Consistent with the present invention, a switching element is provided comprising a plurality of input ports, each of which receives user information and switch configuration update data. A switch matrix is provided coupled to the plurality of input ports. The switching element also includes first and second tables coupled to the switch matrix, with the second table storing current switch configuration data. A switch matrix adjustment circuit is coupled to the first table for sensing the switch configuration update data and feeding this data to the first table. The switch matrix remains configured in accordance with the current switch configuration data while the switch configuration update data is supplied to the first table. After the switch configuration update data has been supplied to the first table, the first table is selectively coupled to the switch matrix, which is then configured in accordance with the switch configuration update data.

The switch configuration update data is typically provided within a frame, along with user information data. The switch configuration update data is thus supplied in-band, and does not require a dedicated input.

Moreover, a switch consistent with the present invention typically includes a plurality of stages or arrays of switch elements, with frames propagating through each stage substantially synchronously. Accordingly, frames do not conflict with one another as they are routed through the switch.

Both the foregoing general description and the following detailed description explain examples of the invention and do not, by themselves, restrict the scope of the appended claims. The accompanying drawings, which constitute a part of this specification, illustrate apparatus and methods consistent with the invention and, together with the description, help explain the principles of the invention.

BRIEF DESCRIPTION OF THE DRAWINGS

The accompanying drawing, which are incorporated in and constitute a part of this specification, illustrate embodiments of the invention and, together with the description, serve to explain the advantages of the invention. In the drawings.

DETAILED DESCRIPTION OF THE INVENTION

Figure 1:
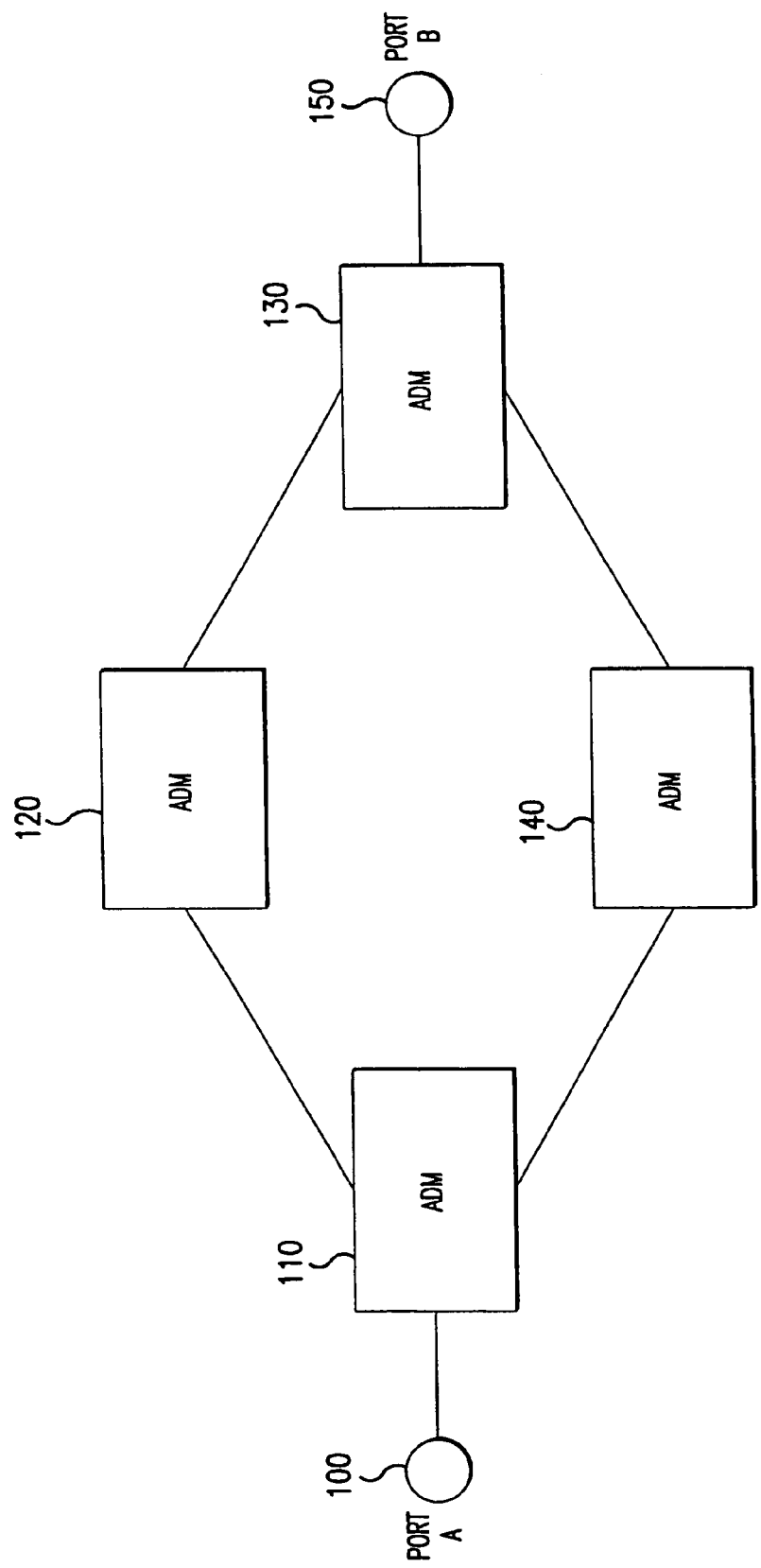
FIG. 1 shows a block diagram of a conventional SONET network.

The following detailed description refers to the accompanying drawings. The same reference characters in different drawings identify the same or similar elements. Also, the following detailed description does not limit the invention. Instead, the scope of the invention is defined by the appended claims.

In accordance with the present invention, a switch is provided that receives user information through a plurality of framer circuits, which group the user information into frames. The frames are fed to a switch fabric including an array of switch elements, each having a switch matrix for routing each frame to a desired output in accordance with configuration data stored in a first table coupled to the switch matrix. If different outputs are desired, i.e., the switch matrix is to be reconfigured, a switch control circuit supplies additional switch configuration data to the frames through the inputs along with additional user information to be routed through the switch. While the additional switch configuration data is stored in a second table, data flow remains uninterrupted through the switch matrix. Once storage of the additional configuration data into the second table is complete, however, the switch control circuit inserts a table select signal into the frames, to thereby couple the second table to the switch so that the switch matrix is configured in accordance with the additional switch configuration data. Subsequent frames are then routed through the reconfigured switch matrix. The first and second tables can thus be alternately updated and coupled to the switch matrix to appropriately reconfigure the switch without affecting existing connections established through the switch. "Hitless switchover" is therefore achieved.

Figure 2:
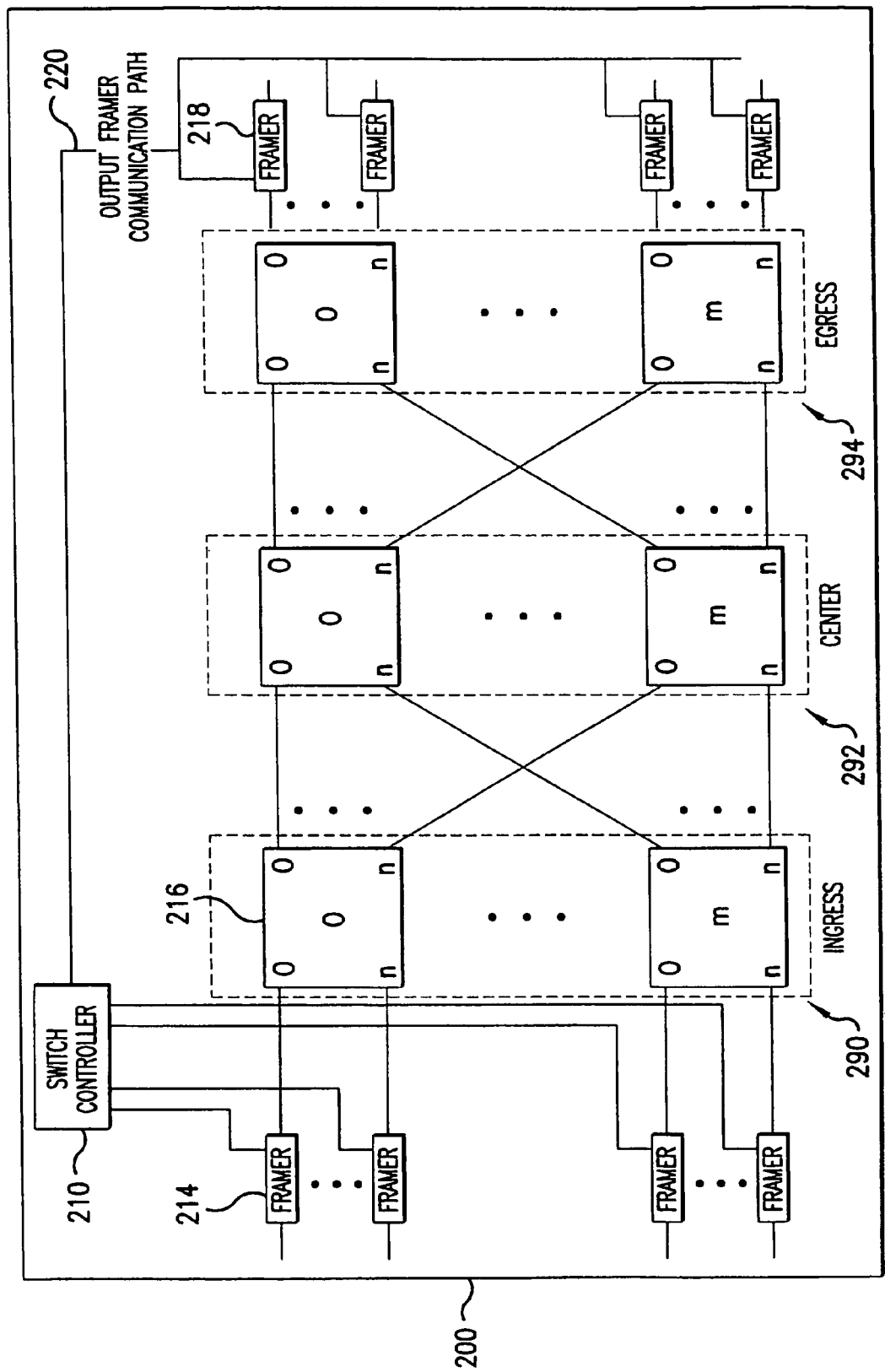
FIG. 2 illustrates an embodiment of a switch consistent with the principles of the present invention.

FIG. 2 illustrates a functional block diagram of a switch 200 in accordance with an embodiment of the present invention. Switch 200 includes, for example, a plurality of input framer circuits 214 receiving user information from an external network. The user information input to switch 200 can be voice communications, or other data to be used by users external to switch 200. Such data often conforms to the SONET protocol.

Framer circuits 214 group the input user information into frames suitable for routing within switch 200, and supply these frames to ingress switch stage 290. A switch controller circuit inserts switch configuration related information into each frame. Such configuration data is thus considered in-band. The frames are next passed to middle stage 292, and then to egress stage 294. Each stage typically includes m+1 switching elements 216, which have n+1 inputs. As further shown in FIG. 2, the outputs from each switch can be coupled to any input of any switch element of a succeeding stage.

After propagating through switching elements 216 of egress stage 294, the frames are fed to respective output framer circuits 218, which output the user information to an external network in accordance with the same protocol at which the user information was input to switch 200. Optionally, an output framer communication path 200 can be coupled to switch controller 210 for monitoring frames supplied to output framer circuits 218.

Figure 3:
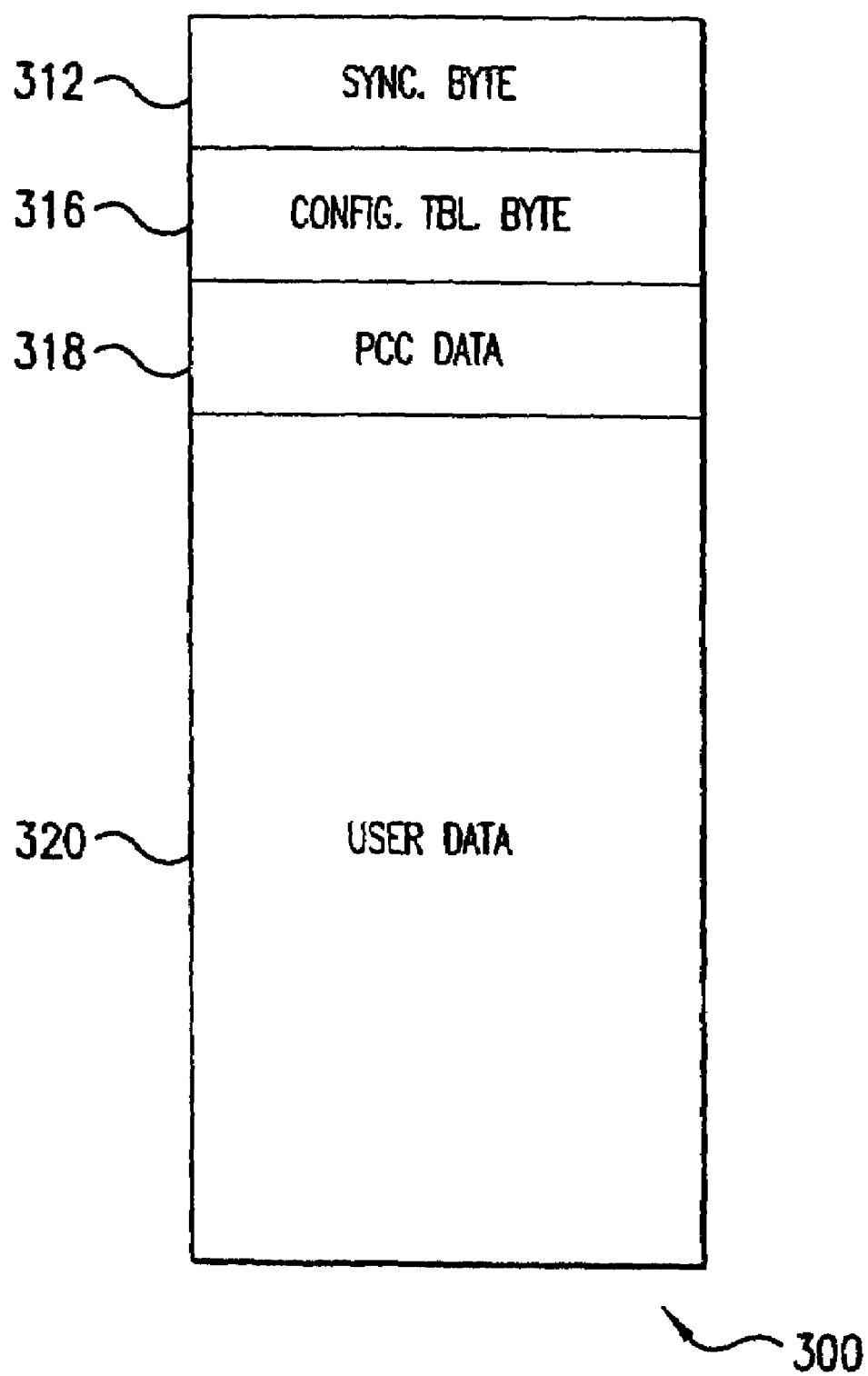
FIG. 3 illustrates a data transport frame for use in conjunction with the switch shown in FIG. 2.

FIG. 3 illustrates an exemplary frame 300 output from one of framer circuits 216. Frame 300 includes field 312 containing a synchronization byte, and is used to indicate the start of a frame to a switch element. In addition, field 312 can be used to synchronize the processing of frames entering switch element 216 on multiple inputs. A configuration table byte, to be discussed in greater detail below, is provided in field 316, for defining the table to be used for the current switch frame. In response to signals output from switch controller circuit 210, framer circuits 214 set this byte, for example, to 0x00 to designate one table and 0xFF to designate the second table.

Field 318 includes processor communication channel (PCC) data, also supplied from switch controller 210, which comprises switch configuration data used to update the tables of the switch elements. Frame 300 further includes field 320 contains user data to be routed through switch 200.

Figure 4:
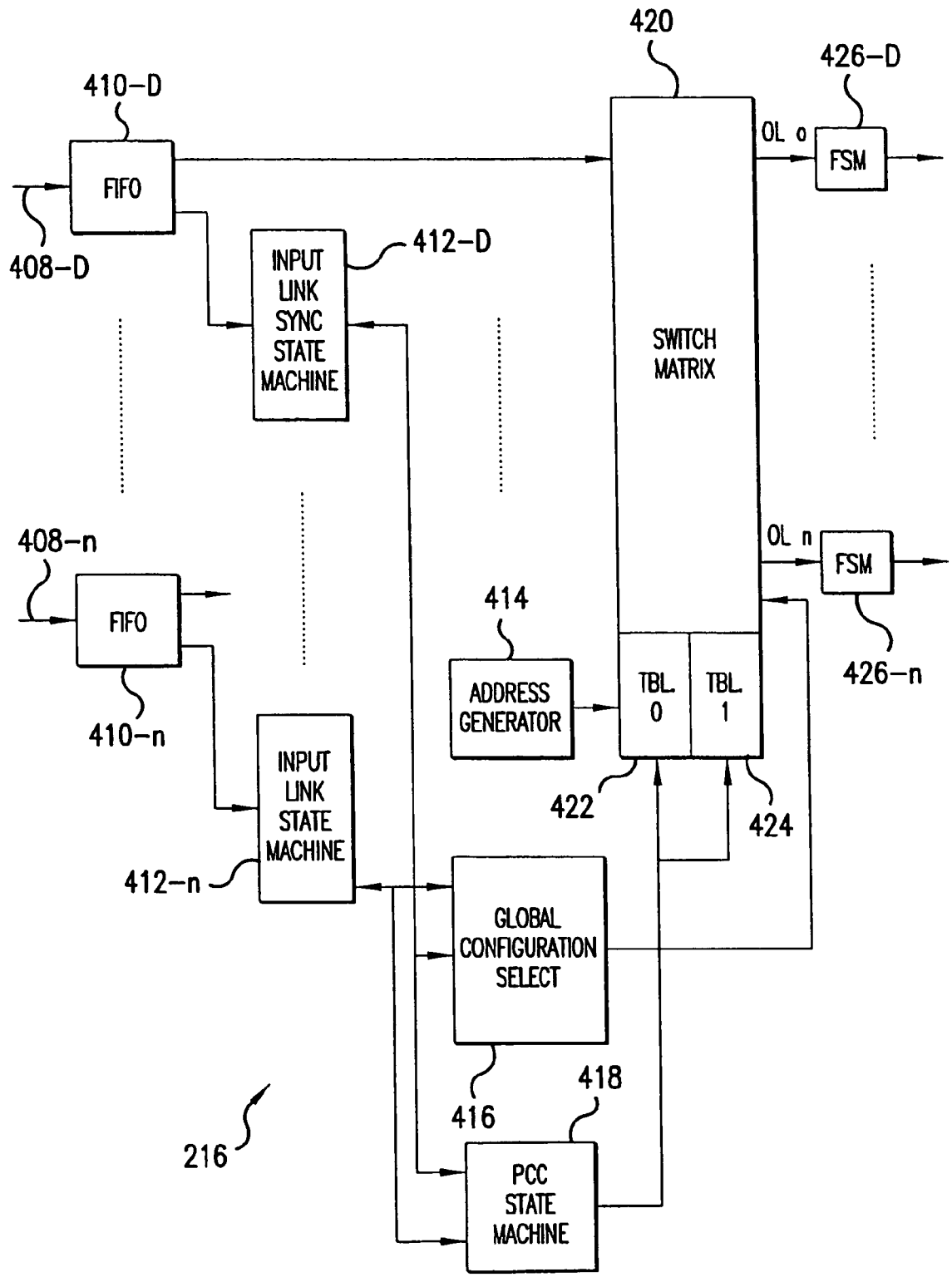
FIG. 4 illustrates one of switching elements 216 shown in FIG. 2.

FIG. 4 illustrates one of switch elements 216 in greater detail. Frames are fed along input lines 408-0 to 408-n, coupled to respective input ports of the switch element. Each input port typically includes a respective one of first-in first out (FIFO) buffer circuits 410-0 to 410-n for absorbing differences in latency across the incoming links, thus synchronizing data moving through switch matrix 420. Each of FIFOs 410-0 to 410-n forwards the received frames directly to switch matrix 420.

As further shown in FIG. 4, each of FIFOs 410-0 to 410-n is respectively coupled to a switch matrix adjustment circuit including, for example, an input link sync state machine (ILSSM) circuits 412-1 to 412-n. ILSSM 412-0 to 412-n circuits include state machine circuits designed to extract switch configuration data, field 318, and table selection data, field 316, from the frames. These fields are fed to a selection circuit, such as global configuration select circuit 416, and PCC state machine circuit 418, both of which can constitute part of the switch matrix adjustment circuit. Field 318 is used by PCC state machine circuit 418 to supply switch matrix configuration data to one of tables Tbl. 0 422 and Tbl. 1 424, which include, for example, a register, static random access memory, dynamic random access memory, or other appropriate memory or storage element. Field 316, on the other hand, is used by global configuration select circuit to output appropriate signals to couple one of Tbl. 0 422 or Tbl 1 424 to appropriately configure switch matrix 420.

While new switch configuration data is supplied to Tbl. 0 422, for example, through PCC state machine 418, global configuration select circuit 416 designates Tbl. 1 424 to remain coupled to switch matrix 420 or active. Accordingly, frames passing through switch matrix 420 are routed uninterrupted, based on configuration data contained in Tbl. 1 424. Once the update of Tbl. 0 422 is completed, however, field 318 designates Tbl. 0 422 for coupling to switch matrix 420 so that frames are routed in accordance with the new switch configuration data contained in Tbl. 0 422. If switch matrix 420 is to be reconfigured again, further switch configuration data is stored in Tbl. 1 424, while frames continue to be routed in accordance with the data contained in Tbl. 0 422. Once this further update is completed, Tbl. 1 424 is coupled to switch matrix 420 again.

Thus, the tables can be alternately coupled to switch matrix 420. While one table is updated, it is rendered inactive and decoupled from switch matrix 420. The other table, however, remains active and data continues to be routed within switch matrix 420 in accordance with the contents of the active table. Once the update is completed, the previously inactive table is coupled to switch matrix 420, and the previously active table is disconnected, but available for receiving new switch configuration data. Throughout this process, data flow remains uninterrupted through switch matrix 420.

In accordance with a further aspect of the present invention, however, if only certain portions of a switch matrix are routing data, configuration data concerning the remaining portions of the switch matrix can be supplied to active table, instead of the inactive table. In this case, once the configuration update is complete, the active table remains coupled to the switch matrix.

Figure 5:
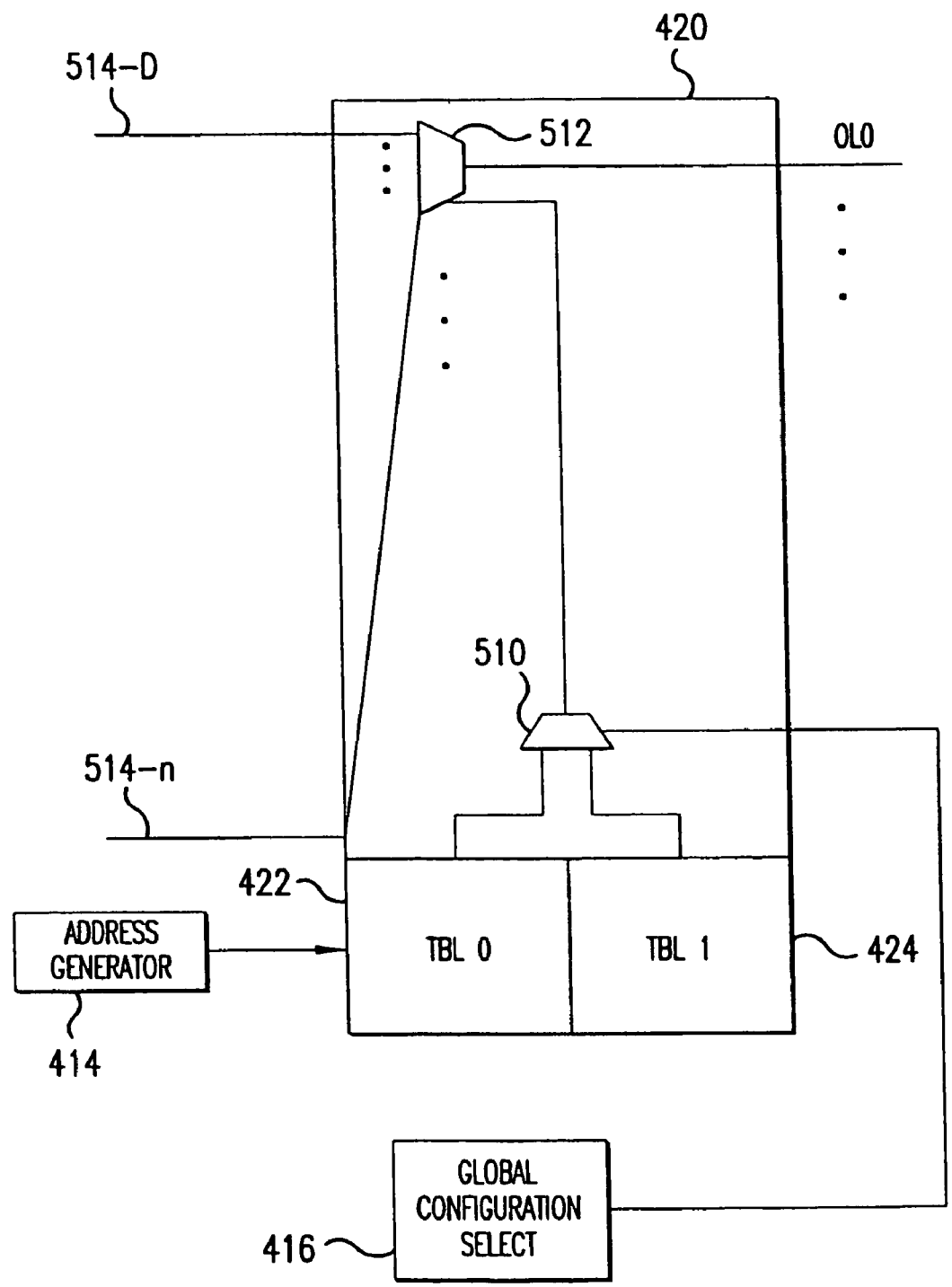
FIG. 5 illustrates a switch element in accordance with a feature of the present invention.

FIG. 5 illustrates switch matrix 420 in greater detail. Switch matrix 420 includes a plurality of multiplexers 512 each of which having a plurality of inputs 514-0 to 514-n coupled to respective ones of FIFOs 410-0 to 410-n. An address generator 414 address particular table locations within tables 422 and 424 for outputting configuration data associated with one of multiplexers 512. In response to a selection signal output from global configuration select circuit 416, a table selector circuit, such as multiplexer 510, supplies the configuration data contained in one of tables 422 and 424 to the corresponding one of multiplexer 512. In turn, multiplexer 512 couples one of inputs 514-0 to 514-n to output line OL0. In a similar fashion remaining multiplexers 512 couple one of inputs 514-0 to 514-n to a respective one of outputs OL 0 to OL n.

Returning to FIG. 4, output lines OL 0 to OL n next feed the switched frames to respective output ports, such as finite state machines 426-0 to 426-n, which are used to insure that the outgoing frames maintain the format shown in FIG. 3. In addition, finite state machines 426-0 to 426-n insert table selection data for the next stage of switch elements.

Figure 6:
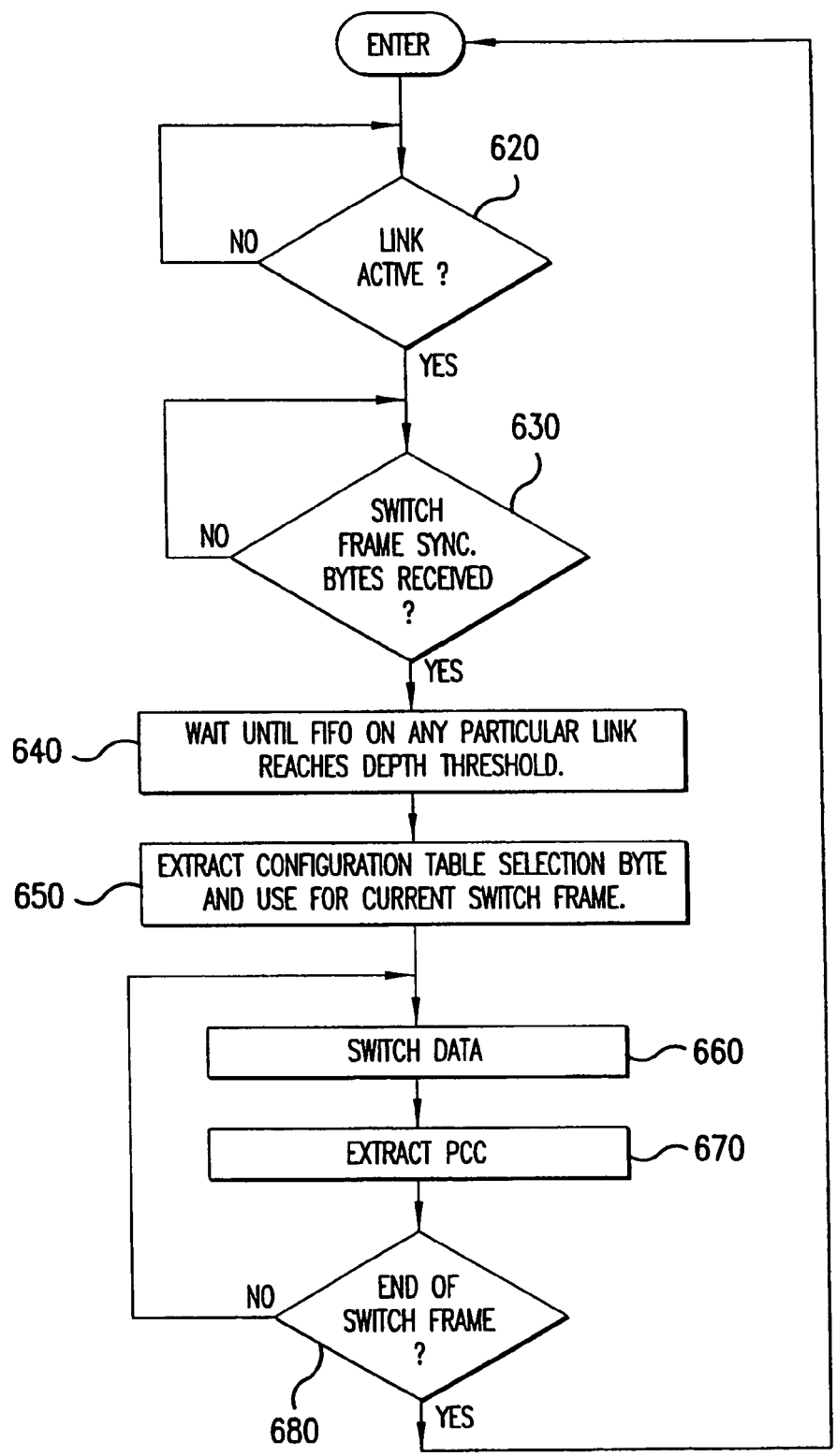
FIG. 6 illustrates a switch frame processing flow chart consistent with a feature of the present invention.

The above-described process for obtaining hitless switchover will now be further described with reference to FIG. 6, which illustrates steps carried out by circuits 412, 416 and 418 when switch matrix 420 is reconfigured. In a first step 610, a frame enters one of FIFO buffers 410-0 to 410-n. In step 620, a determination is made as to whether the input link is active based on whether the received frame conforms to the format shown in FIG. 3. If not, the process returns to step 610 until a frame is received. If an appropriate frame has been received, the process next proceeds to step 630, where, the synchronization byte is to be detected. If it is not found, step 630 is repeated. Once the synchronization byte is identified, however, FIFOs 408-0 to 408-n are monitored to ascertain when one has received a predetermined amount of data, i.e., whether a depth threshold has been reached (step 640). At which point, all the active links are presumed to have data. The frames are then launched to switch matrix 420 substantially at the same time. Step 640 thus assures that frames are synchronized during propagation through a given switch element. Moreover, since all switch elements in a given stage receive frames at substantially the same time, switch elements operate synchronously within each stage.

In step 650, the configuration table selection byte is extracted for the current switch frame to designate one of tables 422 and 424 for coupling to switch matrix 420. The data is then passed through switch matrix 420 in accordance with the contents of the designated table (step 660) and is switched to desired outputs. In step 670, PCC data (field 318) is extracted to update one of tables 422 and 424 not designated by table select data extracted in step 650. If the end of the switch frame is reached, new frames are loaded into respective buffers 410-1 to 410-n, and the process returns to step 610. If not, steps 660, 670 and 680 are repeated.

Stages 292 and 294 shown in FIG. 2 include switching elements having a similar construction as that shown FIG. 4, and frames propagating through these stages have a similar format as that shown in FIG. 3. Switching elements in stages 292 and 294 can thus be reconfigured as discussed above, so that frames are transmitted through switch 200 uninterrupted and synchronously within each stage, even when the switch matrix within each element is to be altered. Typically, however, in order to reconfigure switch elements within each stage, additional switch configuration data is supplied through framer circuits 214. Such data passes through the first stage, for example, and is sensed in the successive stage for which it is intended.

In conclusion, systems and methods consistent with the invention provide for altering a switch from a first configuration to a second configuration without losing data or time, thus achieving hitless switchover. It will be apparent to those skilled in the art that various modifications and variations can be made to the hitless switchover switch consistent with the present invention, and in construction of a network using such systems, without departing from the scope or spirit of the invention. For example, although the figures illustrate elements communicating with each other over communication paths in the form of buses and dedicated lines, it should be understood that the communications paths may take any form that is capable of transferring the required information.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for switching data comprising the steps of:
    combining user information and first switch configuration data into a common data stream;
    extracting said first switch configuration data from said common data stream and storing said first switch configuration data in a first table;
    configuring a switch matrix in accordance with said first switch configuration data;
    passing said user information through said configured switch matrix
    combining said user information and second switch configuration data into said common data stream;
    extracting said second switch configuration data from said common data stream and storing said second switch configuration data in a second table;
    reconfiguring said switch matrix in accordance with said second switch configuration data; and
    passing said user information through said reconfigured switch matrix;
    wherein said reconfiguring is triggered by the receipt of table selection data also combined into said common data stream.

2. A switching method comprising the steps of:
    supplying a first plurality of frames to a corresponding plurality of input ports, said plurality of input ports being coupled to a switch matrix;
    configuring said switch matrix in accordance with first switch configuration data included in at least one of said first plurality of frames and stored in a first table if received table selection data so indicates;
    supplying a second plurality of frames to said corresponding plurality of input ports;
    configuring said switch matrix in accordance with second switch configuration data included in at least one of said second plurality of frames and stored in a second table if said received table selection data so indicates;
    monitoring an amount of data of at least one of said second plurality of frames fed to one of said plurality of input ports; and
    launching said second plurality of frames from said plurality of input ports to said switch matrix after said amount of data exceeds a predetermined threshold level.

3. A switch comprising:
    a plurality of input ports, each configured to receive first switch configuration data and user information data;
    a switch matrix coupled to said plurality of input ports;
    a plurality of output ports coupled to said switch matrix;
    a switch matrix adjustment circuit coupled to said plurality of input ports and said switch matrix, said switch matrix adjustment circuit being configured to sense said first switch configuration data; and
    a table, said switch matrix adjustment circuit supplying said first switch configuration data to a first portion of said table, said table having a second portion storing second switch configuration data, said user information being routed through said switch matrix in accordance with said second switch configuration data while said first portion of said table receives said first switch configuration data.

4. A switch in accordance with claim 3, wherein said first switch configuration data includes configuration data concerning a first portion of said switch matrix and said second switch configuration data includes configuration data concerning a second portion of said switch matrix.

5. A switch in accordance with claim 4, wherein after said first switch configuration data is stored in said first portion of said table, said first portion of said switch matrix routes further user information in accordance with said first switch configuration data.

* * * * *